United States Patent [19]
Yang

[11] Patent Number: 5,514,916
[45] Date of Patent: * May 7, 1996

[54] POWER UNIT WITH CONTROLLED SPARKING

[76] Inventor: Tai-Her Yang, 5-1 Taipin St., Si-Hu Town, Dzan-Hwa, Taiwan

[*] Notice: The portion of the term of this patent subsequent to Mar. 17, 2013, has been disclaimed.

[21] Appl. No.: 34,285

[22] Filed: Mar. 22, 1993

[51] Int. Cl.$^6$ .................................................. H02J 1/00
[52] U.S. Cl. .................... 307/81; 307/63; 307/77
[58] Field of Search .................. 307/43, 54, 61, 307/63, 77, 80, 81, 85, 71; 323/283, 906; 363/65, 71

[56] References Cited

U.S. PATENT DOCUMENTS 3,487,229  12/1969  Krausz ........................................ 307/71
4,742,243   5/1988  Zabar et al. ............................... 307/81

Primary Examiner—Peter S. Wong
Assistant Examiner—Adolf Berhane
Attorney, Agent, or Firm—Leonard Bloom

[57] ABSTRACT

The power unit of the present invention provides an output voltage of a required value and polarity. By switching electro-mechanical switches connected between battery units and a solid-state switch connected to the output terminals in a specific order, non-sparking and low heat loss switching operations are provided.

1 Claim, 4 Drawing Sheets

POWER UNIT WITH CONTROLLED SPARKING

FIELD OF THE INVENTION

The present invention relates to a power unit, and more particularly, to the power unit consisting of a plurality of batteries, wherein sparking is avoided.

BACKGROUND OF THE INVENTION

Batteries are widely used for various kinds of appliances, for instance, electric vehicles, etc. No matter what kind of storage a battery has (fuel, thermal, or sun-power), each battery has a physical basic voltage.

It is known to those skilled in the art that batteries can be arranged in a power unit in order to provide an output voltage according to a load requirement. As the batteries being re-arranged in different configurations, sparking of electro-mechanical switches connected to the batteries may occur. The sparking also causes substantial heat loss in the power unit.

It would be highly desirable to avoid sparking and to reduce heat loss in such a power unit.

SUMMARY OF THE INVENTION

Accordingly, it is an object of the present invention to provide a controlled non-sparking power unit with reduced heat loss.

It is another object of the present invention to provide a battery power unit wherein the batteries can be arranged in parallel, serial or combined configurations, and wherein said re-arrangements are controlled by a control circuit.

It is still another object of the present invention to provide a battery power unit, wherein electro-mechanical switches connected to respective batteries and a solid-state switch in the control circuit are operated in a predetermined specific order.

In accordance with the teachings of the present invention, the output voltage and capacity of a power unit is chosen in accordance with the need of a load and supplied to the load as a graded voltage. The output voltage is controlled by serial linear members, or by chopped wave switches.

The present invention finds particular application in a power unit having a plurality of identical batteries connected to each other in a predetermined order by electro-mechanical switches. The predetermined order is controlled by a controlling circuit which includes a solid-state switch connected to the electro-mechanical switches and to a central control unit, such that the solid-state switch is operable in a specific order relative to switching of respective electro-mechanical switches. Particularly, when switching the respective electro-mechanical switch "ON", switching "ON" of the solid-state switch is delayed after the electro-mechanical switch; and the solid-state switch is switched "OFF" before the respective electro-mechanical switch is switched "OFF".

Accordingly, a reduced heat loss and non-sparking switching function of a multi-voltage power unit can be attained.

These and other objects of the present invention will become apparent from a reading of the following specification taken in conjunction with the enclosed drawings.

DETAILED DESCRIPTION OF THE INVENTION

Figure 1:
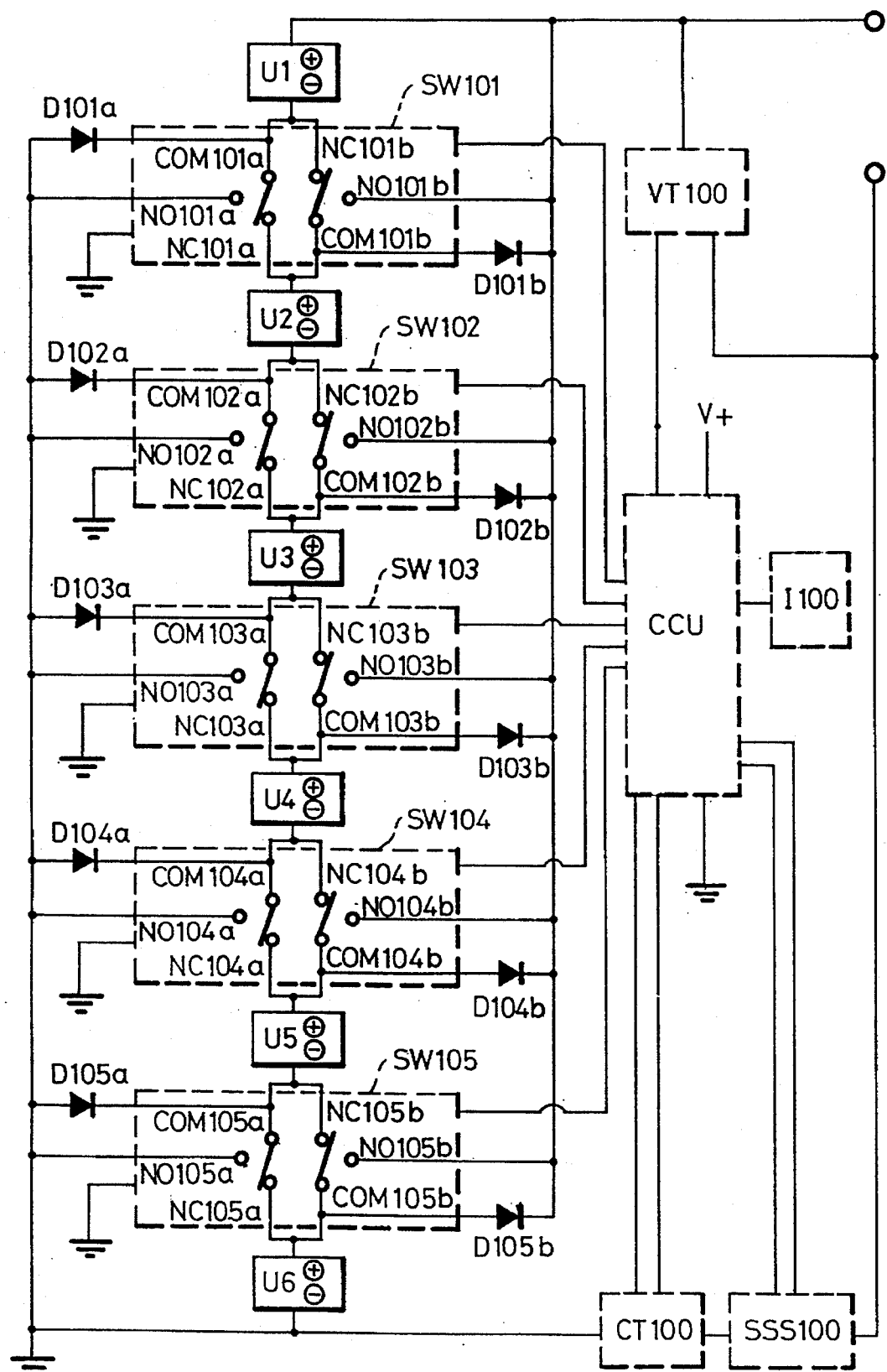
FIG. 1 is a wiring diagram according to one embodiment of the present invention, including two-knife two-throw switches and diodes.

Referring to FIG. 1, a low heat loss, non-sparking independent DC power supply with a control circuit includes batteries U1–U6, serial two-throw (C) contact switches SW101–SW105 and diodes D101a–D105a, D101b–D105b. Each switch SW101–SW105 is connected to ends of a respective diode such that to eliminate a diode's direct voltage reducing and thermal loss. The power unit further includes a current inspection device VT100, linear or switch-mode solid-state switch member SSS100, and a central control unit (CCU) accepting an operation order or instructions from an input device I100 in order to control electro-mechanical switches SW101–SW105 and solid-state switch member SSS100 for adjusting either the output voltage-current flow, or output constant voltage, and also for set-up the limits of output current value, or constant current. When a respective electro-mechanical switch is turned on, the time of operation of solid switch (on) is suspended at the "on" position; when the respective electro-mechanical switch is turned off, the operation time of solid-state switch (off) precedes the electro-mechanical switch to cut off power supply; accordingly, the non-sparking on-off switching of electro-mechanical switches SW101–SW105 is provided. In order to switch positive/negative polarity of the output voltage, the above-described principle is also applicable.

The structure and operation of the preferred embodiment shown in FIG. 1 are disclosed as follows:

Two sets or more than two sets of battery units U1–U6 of the same voltage and/or the same capacity, including linear or quadratic storage battery, sun-power battery, fuel battery, or thermal battery, are re-arranged by means of two-knife manual two-throw switches, drum switches, electro-mechanical switch members, such as magnetic or mechanical operated relay, etc., which are connected between battery units U1–U6 and tend to be in direct-polar series with battery units. Each electro-mechanical switch SW101–SW105 includes two common contacts, two normally opened contacts and two normally closed contacts. In each switch SW101–SW105, the first common contact is connected to the second normally closed contact, and the second common contact is connected to the first normally closed contact. The switches are connected between battery units U1–U6 such that the negative terminal of each battery unit U1–U6 is connected to both the first common contact and the second normally opened contact of the respective switch SW101–SW105, respectively. The positive terminal of another battery unit is connected to both the first normally opened contact and the second common contact of the switch, such that when each switch is actuated by the central control unit CCU, the respective common contacts are connected to respective normally opened contacts or to respective normally closed contacts, thereby providing serial or parallel connection of each battery unit U1–U6.

A plurality of pairs of diodes D101a–D101b, D102a–D102b, D103a–D103b, D104a–D104b, D105a–D105b, are shown in FIG. 1. Each pair of the diodes is connected to each switch SW101–SW105 such that the first diode D101a, D102a, D103a, D104a, D105a of the pair is connected by its negative terminal to the first normally opened contact and by its positive terminal to the first common contact, and the second diode D101b, D102b, D103b, D104b, D105b of the pair is connected by its negative terminal to the second common contact and by its positive terminal to the second normally opened contact. The negative terminals of all respective first diodes are connected to ground. The positive terminals of all respective second diodes are connected to the positive terminal of the pair of the output terminals.

The power unit as described above, has the following function and advantages:

1. Due to the common contact added to normally opened or normally closed contacts, it can provide multiple choice for multi-voltage output.
2. When a certain battery unit contributes into output voltage, all multiple contacts of a respective diode are tended to close so that they can eliminate direct pressure drop and thermal loss of diode.
3. During switching operations, a diode provides linear graded voltage for reducing a switch voltage, and is used as transient current path to prolong the life of switch contact.

In the embodiment shown in FIG. 1, for example, switch SW101 is connected between battery units U1–U2, switch SW102 is connected between U2–U3, switch SW103 is connected between U3–U4, switch SW104 is connected between U4–U5, switch SW105 is connected between U5–U6. Each switch SW101–SW105 has a respective diode D101a–D105a, with their input terminals connected to the negative output terminal and diodes D101b–D105b with their output terminals connected to the output terminal. When a common contact and a normally closed contact of operating switch SW101–SW105 are closed, all battery units are connected in series, and the output voltage is 6×EB. When common contacts of SW102 and SW104 are connected to normally opened contact, the output voltage is 2×EB; that is, every two battery units U1–U2, U3–U4, U5–U6 are serialized and then multiplized. When common contacts connected to normally opened contact, the output voltage is EB; that is, battery unit U1–U6 are multiplized. If we use 24 battery units, we get graded output voltage of 1×EB, 2×EB, 3 ×EB, 4×EB, 6×EB, 8×EB, 12×EB, 24×EB. If we use 36 battery units, we get the output voltage of 1×EB, 2×EB, 3× EB, 4×EB, 6×EB, 9×EB, 12×EB, 18×EB, 36×EB. It will be appreciated by those skilled in the art, that other numbers of battery units may be also used, which work according to the aforesaid principles and mentioned here. Said power unit can be manually switched on/off or be controlled by a central control unit (CCU) and directory input unit I 100. A linear switch or a solid state switch member SSS100 is connected at the negative output terminal in order to adjust and control the electro-mechanical switches and solid switches as follows: directly by means of the linear switch or the solid state switch member SSS100 to adjust the output voltage or by controlling the electro-mechanical switches, make the output voltage higher than the needed output voltage. Then the central control unit (CCU) controls the driven current of linear solid switch member so as to get the needed adjusted linear output voltage.

Figure 2:
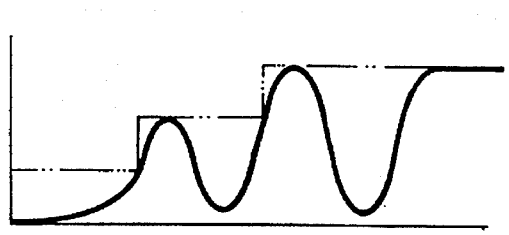
FIG. 2 is a diagram showing a linear adjustment of the output voltage.

Referring to FIG. 2, if we want to adjust the output voltage which is larger than a battery unit voltage, we can do it by means of electro-mechanical switch units and their thermal loss will be reduced. Then, directly by switching the solid-state switch member SSS100, trim the output voltage or by controlling electro-mechanical switches SW101–SW105 output voltage is adjusted to be higher than the needed output voltage. Then the central control unit (CCU) controls the driven pulse range of switched solid-state switch member SSS100 so as to get the adjustment of average output voltage.

Figure 3:
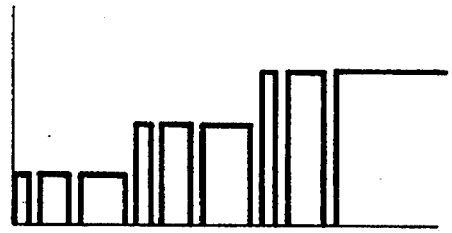
FIG. 3 is a diagram showing a chopped wave adjustment of the output voltage.

Referring to FIG. 3, if we want to adjust an output voltage larger than a battery unit voltage, we can do it by controlling electro-mechanical switches.

An inspection device CT100 is connected to the output battery unit U6 to inspect its output current value and to feed back to central control unit (CCU) according to the instruction of the input unit I100 or the preset value in CCU, and according to specific operational order of electro-mechanical switches and solid state switch SSS100. The inspection device VT100 is connected to the positive output terminal to inspect the output voltage value which feeds back to CCU, in accordance with instructions of input unit I100, or according to specific operational order of the solid-state switch SSS100 and electro-mechanical switches SW101–SW105. Similar to the conventional steady voltage circuit, which has a standard terminal voltage, in addition to adjusting the voltage change caused by unsteady load, it can adjust loaded side voltage change caused by unsteady power voltage. For example, voltage drops in a battery because of a storage reducing or voltage is unsteady in a sun-power battery because sunlight amount is changed.

The most important feature of the present invention is that by controlling electro-mechanical switches SW101–SW105 and the solid-state switch SSS100 in specific order, particularly: once an electro-mechanical switch is switched "on" the solid-state switch (on) is being switched with time delay after the electro-mechanical switch; at the "off" position, the solid-state switch switching off precedes the switching off the electro-mechanical switch, in order to attain non-sparking switching of the electro-mechanic switches. The above-described switching order further includes non-sparking switching of positive and negative polarity of the output voltage.

Figure 4:
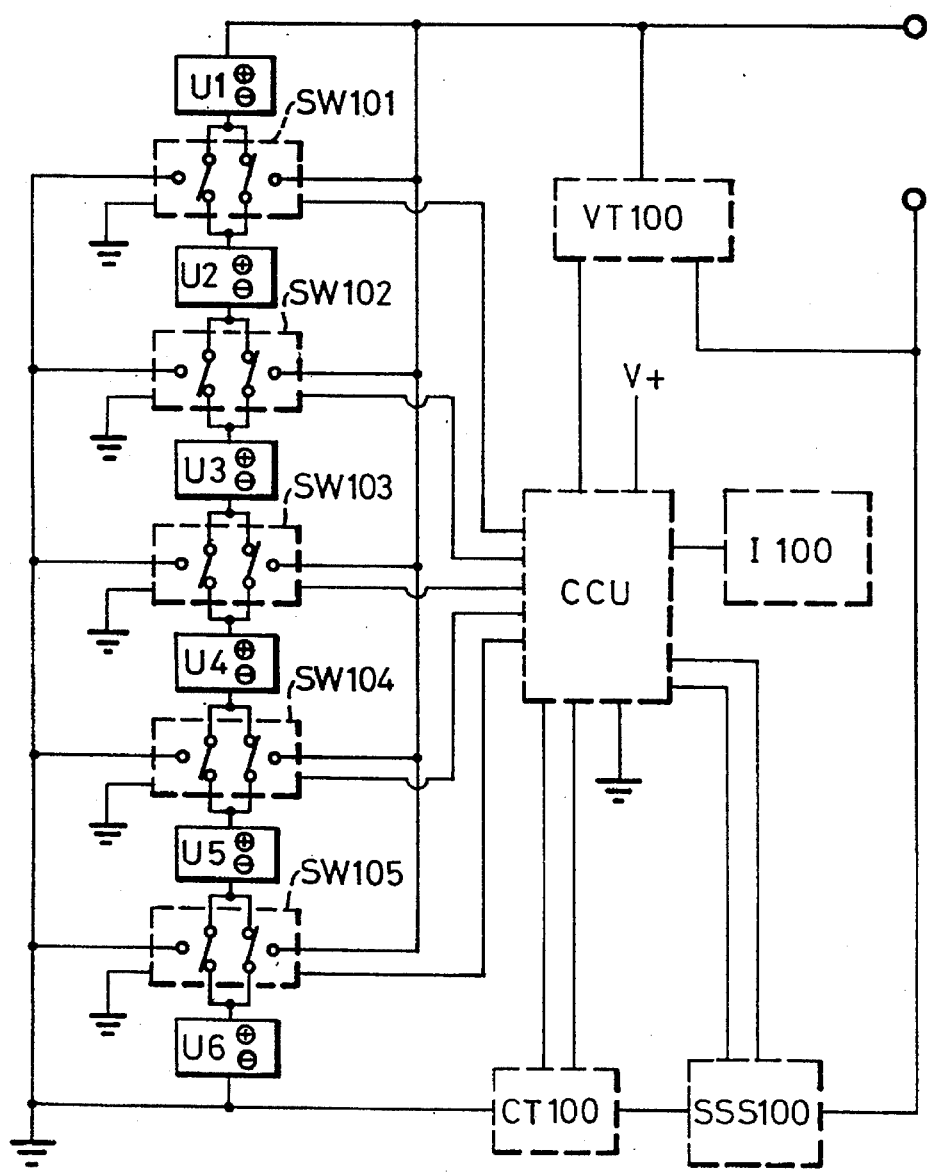
FIG. 4 is a wiring diagram of another embodiment of multi-voltage power unit having a switch circuit comprising two-knife two-throw switches.

The operational order includes modes of manual, electromagnetic, mechanical, and flow control. FIG. 4 is a view of another implementation of the power unit of the present invention with two-knife and two-throw switches, but where diodes are omitted. This kind of circuit can be put into practical uses if power capacity is lower.

Figure 5:
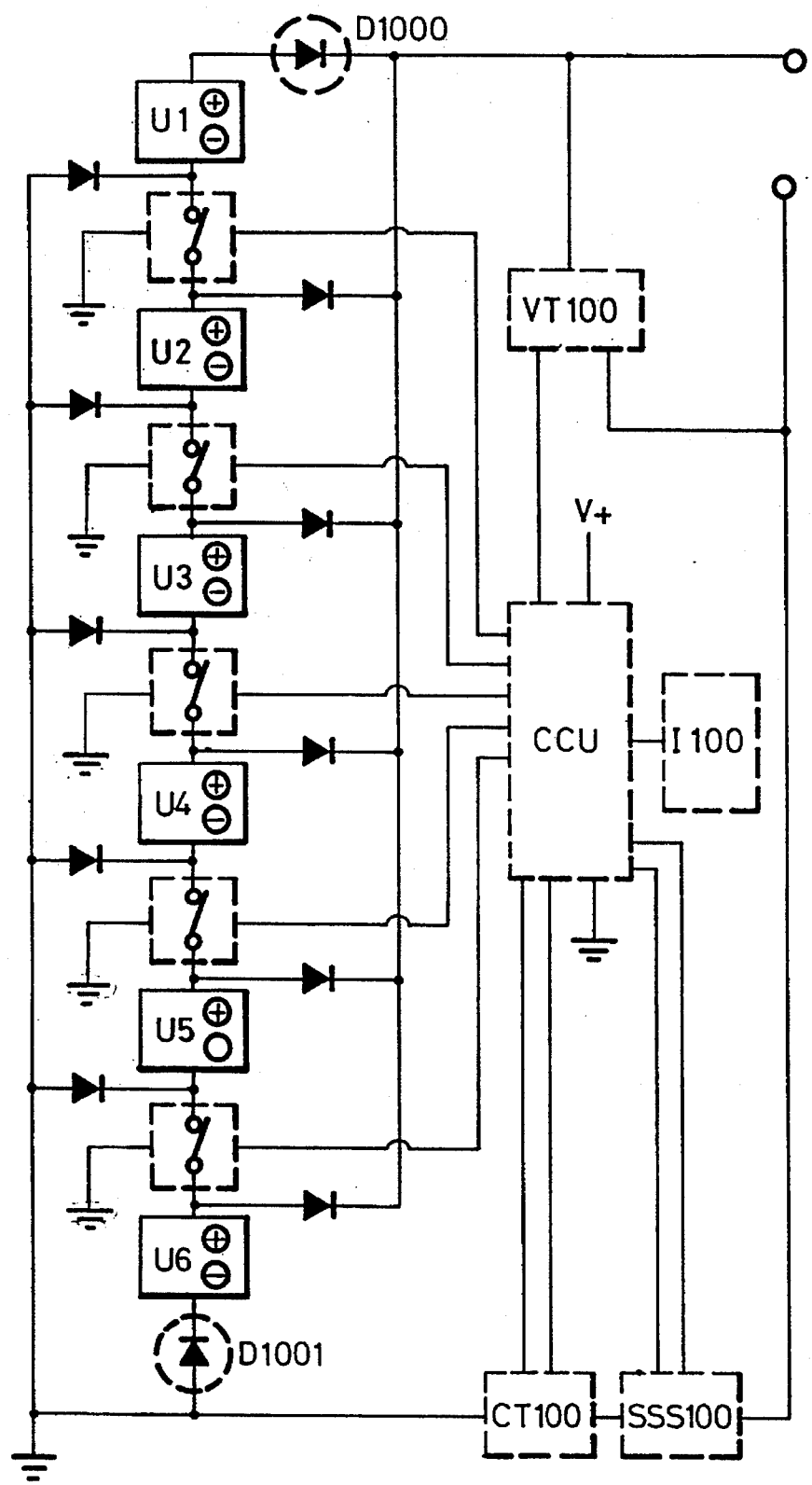
FIG. 5 is a wiring diagram of a multi-voltage power unit having a switch circuit consisting of single-knife switches.

If circuit efficiency is available and application is limited by space, we can connect single-knife single-throw switch to diode so as to produce on/off switching function. We can further connect solid-state switch member SSS100, output voltage current inspection members CT100, VT100, and central control unit CCU which produces the same function as in the above-described embodiments. FIG. 5 is a view of another embodiment of the present invention including single-knife switches. In FIG. 5, D1000 and D1001 are diodes for average pressure used to provide for average output voltage and can be connected when needed.

Moreover, electro-mechanical switches may be replaced by solid-state switch members, with connected diodes so as to form a required voltage output solid switches and diodes. In this circuit its switching function is the same as that of FIG. 5.

Figure 6:
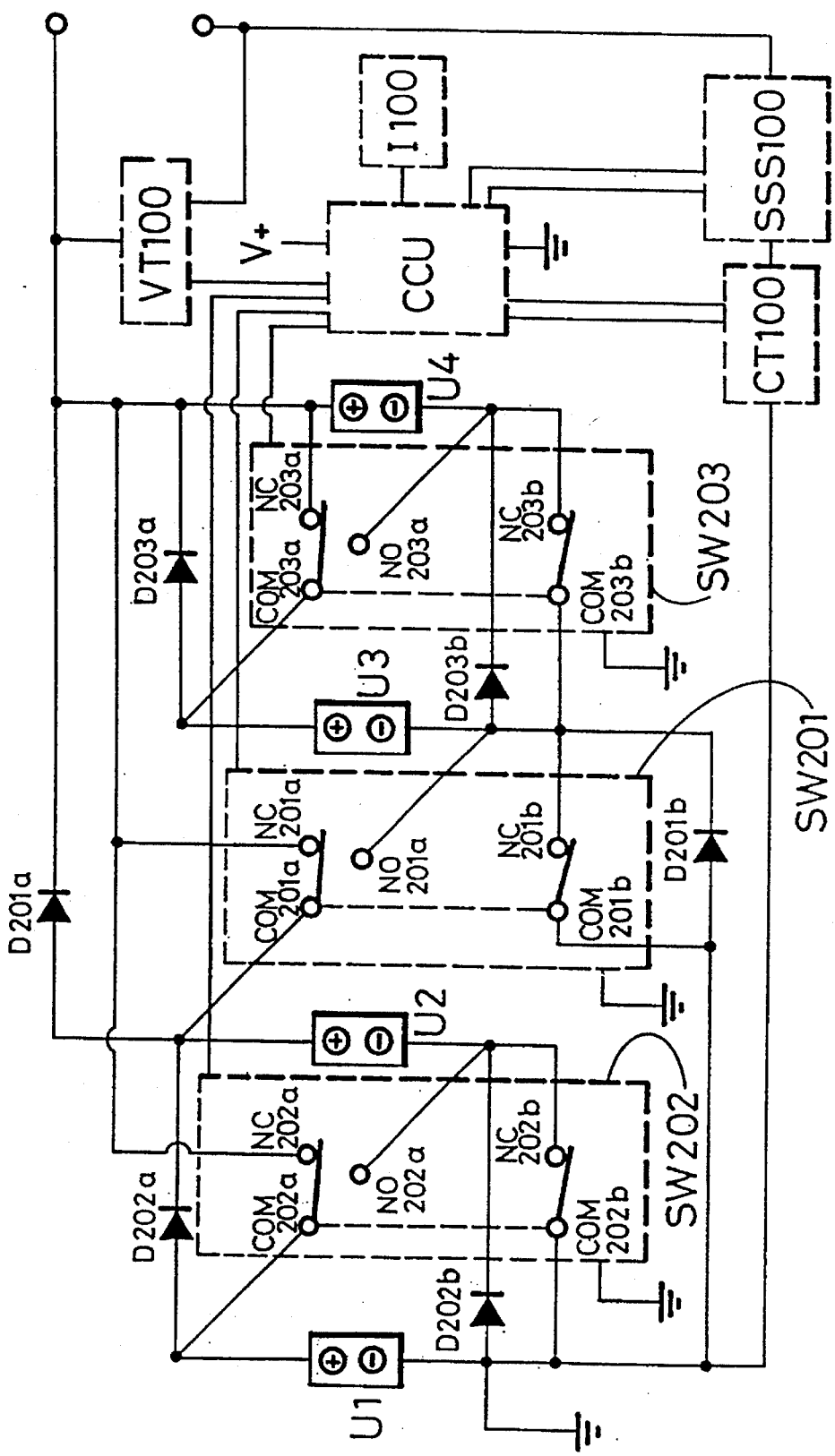
FIG. 6 is a wiring diagram of yet another embodiment of the present invention using tree-branch switch circuit and series diode to form a multi-voltage circuit.

In the embodiment shown in FIG. 6, we can use the other type of electro-mechanical switches. The operational switching order of this circuit is as follows: the switching "on" operation of solid-state switch is accomplished before the switching "on" of the electro-mechanical switch, the switching off operation of solid-state switch is accomplished after the switching "off" of the electro-mechanical switch. When the solid-state switch is used for linearization or for PW Modulation of the output voltage, the electro-mechanical switch which is serialized to it will not operate. This solid-state switch and the electro-mechanical switch can be controlled by either CCU, manually, electro-magnetically, mechanically, or hydro-dynamically.

Another implementation of said circuit is shown in FIG. 6. It consists of two sets or more than two sets of battery units of same voltage, same capacity, or at least of the same voltage, and of branch connected switches for switching on/off the battery units in required order to obtain a required output voltage. When an output voltage is produced, a switch will be connected to segmented diode's two ends so as to eliminate the diode's direct voltage reducing and thermal loss. It can further include diodes D201a–D203a, D201b–D203b, current inspection device CT100 linear or switch-mode solid-state switch member SSS100, and a central control unit (CCU) which controls electro-mechanical switches and solid-state switch member for adjusting the output voltage in accordance with operation order from input device I100, or set the limits of output current value. The order of switching ON/OFF operations of electro-mechanical switches and the solid-state switch members is similar to aforesaid one.

In conclusion, the basic object of the present invention has been achieved, namely, to provide an effective newly designed power unit which can provide a graded output voltage having low heat loss and non-sparking switching operations.

I claim:

1. A power unit with controlled output voltage comprising a plurality of substantially identical battery units which are interconnected by a central control unit for connecting the battery units in a series and parallel arrangement for providing a required output voltage on a pair of output terminals in a wide range of output voltages, the output terminals including positive and negative output terminals, respectively; wherein the battery unit provides a terminal voltage EB, and wherein the output voltage may have a value of N×EB, wherein N= 1, 2, 3, . . . ; said power unit further comprising a plurality of electro-mechanical switches, each having first and second common contacts, first and second normally closed contacts, and first and second normally opened contacts, respectively, such that in each electro-mechanical switch the first common contact is connected to the second normally closed contact, and the second common contact is connected to the first normally closed contact, wherein said electro-mechanical switches are connected between said battery units such that the negative terminal of each battery unit is connected to both the first common contact and the second normally closed contact of the switch, respectively, and the positive terminal of another battery unit is connected to both the first normally closed contact and the second common contact of the switch, such that when each electro-mechanical switch is actuated by the central control unit, the respective common contacts are connected to respective normally opened contacts or to respective normally closed contacts, thereby providing serial or parallel connection of each battery unit, wherein the first normally opened contacts of all the electro-mechanical switches are connected to ground, wherein the second normally opened contacts of all the electro-mechanical switches are connected to the positive terminal of the pair of output terminals, wherein a solid-state switch is connected between the central control unit and the negative output terminal, and wherein said electro-mechanical switches and said solid-state switch are switched in a specific order, such that when a respective electro-mechanical switch is switched on, the solid-state switch is switched on with a certain time delay, and when the respective electro-mechanical switch is switched off, the solid-state switch is switched off with a certain leading time, wherein the power unit further includes a plurality of pairs of diodes, wherein each pair has first and second diodes, wherein each of the diodes has respective positive and negative terminals, wherein each pair of the diodes is connected to each switch such that the first diode of the pair is connected by its negative terminal to the first normally opened contact and by its positive terminal to the first common contact, and the second diode of the pair is connected by its negative terminal to the second common contact and by its positive terminal to the second normally opened contact, wherein the negative terminals of all respective first diodes are connected to ground, and wherein the positive terminals of all respective second diodes are connected to the positive terminal of the pair of the output terminals.

\* \* \* \* \*